US007783645B2

(12) United States Patent
Hess et al.

(10) Patent No.: US 7,783,645 B2
(45) Date of Patent: Aug. 24, 2010

(54) METHODS AND APPARATUS TO RECALL CONTEXT RELEVANT INFORMATION

(75) Inventors: Christopher K. Hess, San Francisco, CA (US); Michael Wynblatt, Moraga, CA (US); Mark H. Sher, San Francisco, CA (US)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 11/304,432

(22) Filed: Dec. 14, 2005

(65) Prior Publication Data
US 2007/0136245 A1 Jun. 14, 2007

(51) Int. Cl.
*G06F 17/30* (2006.01)
(52) U.S. Cl. ...................... 707/751; 707/736
(58) Field of Classification Search .......... 707/2–4, 707/104.1, 751, 736, 999.006, 999.107
See application file for complete search history.

(56) References Cited

U.S. PATENT DOCUMENTS

| 6,275,229 B1* | 8/2001 | Weiner et al. ............... 715/764 |
| 6,901,398 B1 | 5/2005 | Horvitz et al. |
| 6,925,433 B2 | 8/2005 | Stensmo |
| 6,925,650 B1 | 8/2005 | Arsenault et al. |
| 2002/0010625 A1* | 1/2002 | Smith et al. .................... 705/14 |
| 2002/0059288 A1* | 5/2002 | Yagi et al. .................... 707/102 |
| 2003/0016803 A1* | 1/2003 | Schmid et al. ......... 379/201.01 |
| 2003/0158855 A1* | 8/2003 | Farnham et al. ............. 707/102 |
| 2004/0088276 A1* | 5/2004 | Elder et al. ..................... 707/1 |
| 2004/0267730 A1* | 12/2004 | Dumais et al. ................. 707/3 |
| 2005/0154723 A1 | 7/2005 | Liang |
| 2006/0036405 A1* | 2/2006 | Byrd et al. .................. 702/186 |

OTHER PUBLICATIONS

Nat Friedman, "Dashboard", XIMIAN, Jul. 25, 2003. 23pgs.
Daniel Billsus et al., "Improving Proactive Information Systems", IUI '05, Jan. 9-12, 2005, San Diego, California, USA. Copyright 2005 ACM 1-58113-894-6/05/0001. 8pgs.
Jay Budzik et al., "Watson: An Infrastructure for Providing Task-Relevant, Just-In-Time Information". 6pgs.
Mary Czerwinski et al., "Visualizing Implicit Queries For Information Management and Retrieval", Papers, CHI 99 May 15-20, 1999, pp. 560-567.
Michael Beigl, "MemoClip: A Location based Remembrance Appliance", 5pgs.
Samuel Kaski et al., "User models from implicit feedback for proactive information retrieval", 2pgs.
Susan Dumais et al., "Stuff I've Seen: A System for Personal Information Retrieval and Re-Use", *SIGIR '03*, Jul. 28-Aug. 1, 2003, Toronto, Canada. Copyright 2003 ACM 1-58113-646-3/03/0007. 8pgs.

(Continued)

*Primary Examiner*—John E Breene
*Assistant Examiner*—Thu-Nguyet Le
(74) *Attorney, Agent, or Firm*—Buckley, Maschoff & Talwalker LLC

(57) ABSTRACT

Systems and methods are provided to facilitate retrieval of context relevant information. According to some embodiments, an event associated with a computer system is captured. In response to the captured event, a subset of data objects are selected that may be related to the event. A list associated with the subset of data objects may then be created, wherein the list is at least partially ordered based on a degree of relevance between a data object in the list and the event. Information associated with the created list may then be provided.

37 Claims, 15 Drawing Sheets

OTHER PUBLICATIONS

Meredith Ringel et al., "Milestones in Time: The Value of Landmarks in Retrieving Information from Personal Stores", 8pgs.
Travis Bauer et al., WordSieve: A Method for Real-Time Context Extraction, 14pgs.
B. J. Rhodes and P. Maes, "Just-in-time information retrieval agents", IBM Systems Journal, vol. 39, Nos. 3&4, 2000, 0018-8670/00, © 2000 IBM, Rhodes and Maes. pp. 685-704.
Jim Youll et al., "Impulse: Location-based Agent Assistance", MIT Media Lab, 2pgs.
Mik Lamming and Mike Flynn, "Forget-me-not Intimate Computing in Support of Human Memory", Rank Xerox Research Center, Cambridge, England, 9pgs.
Paul De Bra et al.; "Task-Based Information Filtering: Providing Information that is Right for the Job". [Retrieved Dec. 12, 2005]. Retrieved from Internet: URL: http://wwwis.win.tue.nl/infwet97/proceedings/task-based.html, 5pgs.
Bradley J. Rhodes, "Margin Notes Building a Contextually Aware Associative Memory", Jan. 9-12, 2000. [Retrieved Dec. 12, 2005]. Retrieved from Internet: URL: http://web.media.mit.edu/~lieber/IUI/Rhodes/Rhodes.html, 9pgs.
"Click popularity—A Promotion Guide". [Retrieved Dec. 12, 2005]. Retrieved from Internet: URL: http://www.apromotionguide.com/click_popularity_theory.html, 3pgs.
"Activity Monitor—Employee Monitoring Software", Network PC Monitoring Software, SoftActivity. [Retrieved Dec. 12, 2005]. Retrieved from Internet: URL: http://www.softactivity.com/employee-monitoring.asp, 5pgs.
"Active Windows Extensions (AWE)". [Retrieved Dec. 12, 2005]. Retrieved from Internet: URL: http://www.autonomy.com/content/Products/Interfaces/AWE.html, 4pgs.
"All Your Information Is Within Reach", Nov. 1, 2005, EasyReach™. [Retrieved Dec. 12, 2005]. Retrieved from Internet: URL: http://www.easyreach.com/enfishusers.asp, 2pgs.
"Xl® Desktop Search—Find, view, and act on email and files throughout your enterprise". [Retrieved Dec. 12, 2005]. Retrieved from Internet: URL: http://www.xl.com/, 2pgs.
"Viapoint Corporation—Creator of the Smart Organizer for communications professionals", Nov. 15, 2005. [Retrieved Dec. 12, 2005]. Retrieved from Internet: URL: http://www.viapoint.com/, 1pg.
"blinkx 3.5" [Retrieved Dec. 12, 2005]. Retrieved from Internet: URL: http://www.blinkx.com/overview.php, 4pgs.
Entopia Technology, "True Relevancy" [Retrieved Dec. 13, 2005]. Retrieved from Internet: URL: http://222.entopia.com/technology/relevancy/index.html, 2pgs.
Neil J. Rubenking, "Creo Six Degrees 2.0", Jun. 2, 2004. [Retrieved Dec. 13, 2005]. Retrieved from Internet: URL: http://www.pcmag.com/article2/0,1895,1606220,00.asp. 5pgs.
Henry Lieberman, "Letizia: An Agent That Assists Web Browsing". [Retrieved Dec. 13, 2005]. Retrieved from Internet: URL: http://liever.www.media.mit.edu/people/lieber/Lieberary/Letizia/Letizia-AAAI/Letizia.html. 9pgs.
Bradley J. Rhodes and Thad Starner, "Remembrance Agent: A continuously running automated information retrieval system". [Retrieved Dec. 13, 2005]. Retrieved from Internet: URL: http://www.cc.gatech.edu/fac/Thad.Starner/p/032_40_agents&ubicomp/remembrance-age. 6pgs.
C. Hess, U.S. Appl. No. 11/304,527, filed Dec. 14, 2005, entitled "Methods and Apparatus to Determine a Software Application Data File and Usage".
C. Hess, and M. Wynblatt, U.S. Appl. No. 11/304,917, filed Dec. 14, 2005, entitled "Methods and Apparatus to Determine Context Relevant Information".
C. Hess, U.S. Appl. No. 11/304,415, filed Dec. 14, 2005, entitled "Methods and Apparatus to Abstract Events in Software Applications or Services".

* cited by examiner

600

| FIRST DATA OBJECT ID 602 | SECOND DATA OBJECT ID 604 | TYPE 606 | WEIGHT 608 | CONF. 610 | COUNT 612 |
|---|---|---|---|---|---|
| DO101 | DO643 | TOGGLE | 2 | 2 | 1 |
| DO101 | DO530 | OPEN AT SAME TIME | 4 | 1 | 1 |
| DO102 | DO331 | TOGGLE | 5 | 4 | 59 |

FIG. 6

METHODS AND APPARATUS TO RECALL CONTEXT RELEVANT INFORMATION

TECHNICAL FIELD

The present disclosure relates generally to information retrieval and, more particularly, to methods and apparatus to facilitate retrieval of context-relevant information.

BACKGROUND

Users often need to access a particular piece of information stored on a personal computer. For example, a user might need to find a particular email message or document that is stored on the computer. The increasing amount of information and the many different types of information (e.g., telephone calls, e-mails, and instant messages) that are being accessed by users can make finding a particular piece of information a difficult and time consuming task.

Note that when users perform tasks on computer systems, they often summon a collection of information sources to complete the task. On most computing systems, information is often organized in a hierarchical structure and more recently by using "virtual" folders that contain pointers to information sources. People have developed different ways in which to manage and find the necessary information more efficiently and quickly, many of which require the user to explicitly organize, tag, or categorize the information. Such manual effort can be time consuming and the organization structure often breaks down over time as compartmental boundaries are crossed and change.

Accordingly, there is a need for methods and apparatus that address these and other problems found in existing technologies.

SUMMARY

Methods, systems, and computer program code are therefore presented to facilitate retrieval of context-relevant information.

According to some embodiments, systems, methods, and computer code are operable to capture an event associated with a computer system. In response to the captured event, a subset of data objects are selected that may be related to the event. A list associated with the subset of data objects may then be created, wherein the list is at least partially ordered based on a degree of relevance between a data object in the list and the event. Information associated with the created list may then be provided.

Other embodiments may provide: means for capturing an event associated with a computer system; means for, in response to the captured event, selecting a subset of data objects that may be related to the event; means for creating a list associated with the subset of data objects, wherein the list is at least partially ordered based on a degree of relevance between a data object in the list and the event; and means for outputting information associated with the created list.

With these and other advantages and features of embodiments that will become hereinafter apparent, embodiments may be more clearly understood by reference to the following detailed description, the appended claims and the drawings attached herein.

BRIEF DESCRIPTION OF THE DRAWINGS

FIG. 6 illustrates information in an evidence store according to some embodiments;

DETAILED DESCRIPTION

Figure 1:
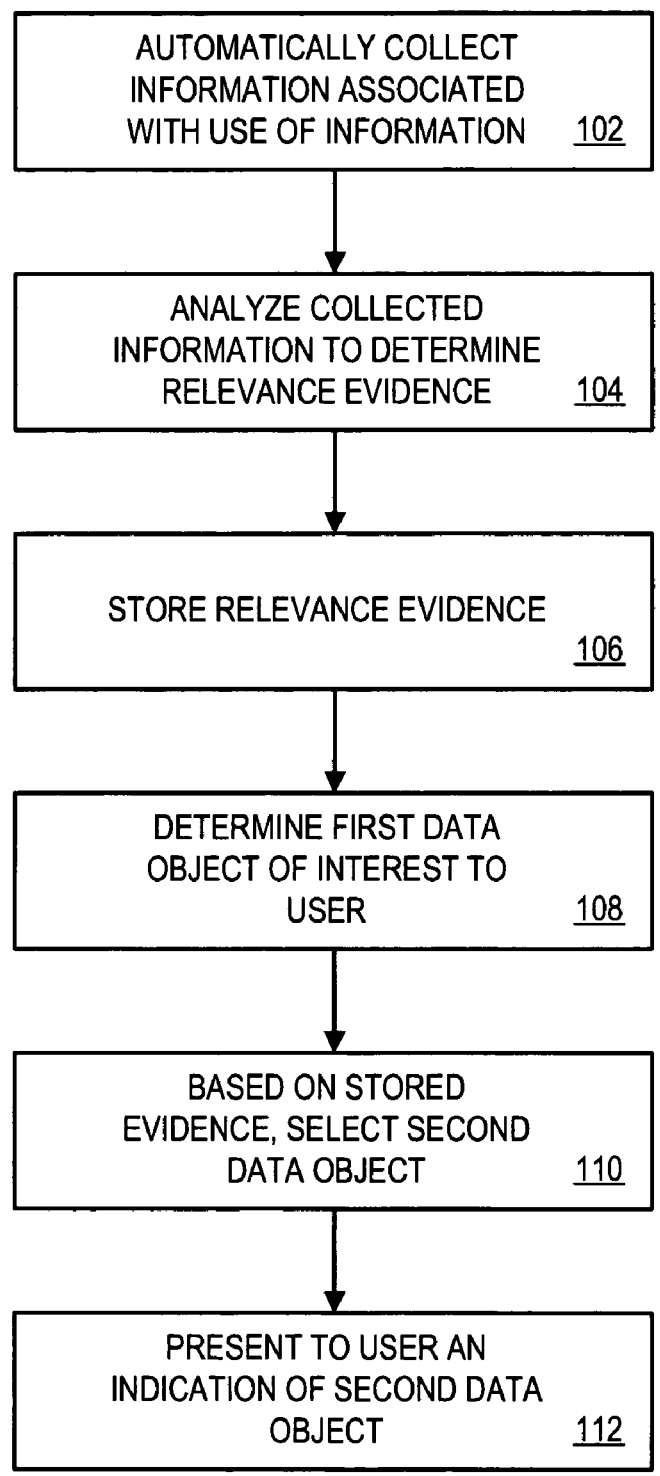
FIG. 1 is a flowchart of a method according to some embodiments.

Some embodiments described herein may automate a process of recalling and discovering information related to a given task or activity. The retrieval of information may be performed proactively by automatically presenting a user with relevant "data objects" as he or she performs operations on a computer system. As used herein, the phrase "data objects" may refer to any piece or type of information. Examples of data objects include (but are not limited to) applications, application files (e.g., MICROSOFT WORD® documents and EXCEL® spreadsheets), other types of files, information folders, email messages, database entries, web pages, telephone calls, instant messages, calendar entries, contact entries, and media objects (e.g., an MP3 file).

Operations may occur when a user acts on data objects through applications, such as by opening, creating, accessing, or activating a data object. An operation may also be initiated from an external peripheral device, such as a printer, private branch exchange (PBX), soft switch, telephony server, communications server, voice modem, Centrex service, or telephone handset. For example, an email server may receive an incoming message and send a notification that a new message has been created.

According to some embodiments, it may be determined which data objects are most relevant for a user's current activity or task (context) by accumulating "evidence" of the relatedness of other data objects and using that evidence to determine what information may be important during a given activity. Evidence may be generated, for example, by continually monitoring information usage, location, and content to determine how pieces of information are connected together. Whenever evidence of a connection is determined, it may be stored into an evidence database. "Usage" evidence might be generated, for example, by looking at how users interact with data objects through applications to infer how the objects might be related. As another example, "location" evidence might be generated by determining the proximity of data objects. As still another example, "content" evidence might be generated by analyzing the terms contained within data objects to determine how closely that data object matches to other data objects.

This accumulated evidence might then be used to determine which data objects are connected to one another and how strongly the connections are. Evidence may be used to find which data objects are most relevant during an activity and the strength of evidence is used to order the data objects so that more relevant data objects are placed closer to the top of the resulting list. The list of relevant data objects could be, for example, regenerated every time a user gives focus to a different data object.

According to one embodiment of the present invention, the resulting list of relevant data objects is displayed in a Graphical User Interface (GUI) that is visible at a dedicated and/or user-definable area of the computer display (e.g., a column on the left-hand side of the display). Each data object presented in the relevance list could contain, for example, a hyperlink allowing it to be opened with its preferred native application, or alternately, may specify a custom action. Additional hyperlinks might allow other actions to be performed on the data object, such as getting summary information or getting further relevant information. The displayed results could be organized by separating different types of data objects into separate sections of the display.

In addition to the evidence generated results, other relevant information can be displayed based on relevance rules. For example, given an active telephone call, recent email messages from the caller can be displayed based on a rule that first determines the caller from the incoming phone number and then displaying the last few mail messages to/from the person who is identified as the caller.

FIG. 1 is a flow chart of a method of facilitating access to data objects according to some embodiments of the present invention. The flow charts described herein do not imply a fixed order to the steps, and embodiments of the present invention may be practiced in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 102, information associated with use of data objects is automatically collected. For example, a personal computer user might simultaneously open a first document and a second document, and this fact may be automatically collected by a software application executing in the background of the operating system. Note that a data object might be used by a user and/or by another application.

At 104, the collected information is analyzed to determine relevance evidence between data objects. For example, it might be determined that the first document is related to both the second document (because they were open at the same time) and an email message (because the user eventually attached the first document to that email message. This evidence is then stored at 106 (e.g., in a database file).

At 108, a first data object of interest to the user is determined. For example, a user might later re-open the first document and begin to edit the document. Based on the stored relevance evidence, a second data object associated with the first data object is selected. For example, the second document and the related email message might be selected. An indication of the second data object is then presented to the user. Note that more than one related data object might be selected and displayed to the user. For example, a list including the second document and the related email message might be displayed in a dedicated area of a GUI.

According to some embodiments, usage, location, and content of data objects may be analyzed to determine relevance evidence between data objects. For example, it might be determined that two documents share a significant number of unusual words. As another example, a first document might refer to a second document. This additional relevance evidence may also be stored, and the selection of the second data object at 110 could further be based on the stored additional relevance evidence. An indication of the selected data object might then be provided at 112 (e.g., by presenting the indication to a user or transmitting an identifier to another application).

Figure 2:
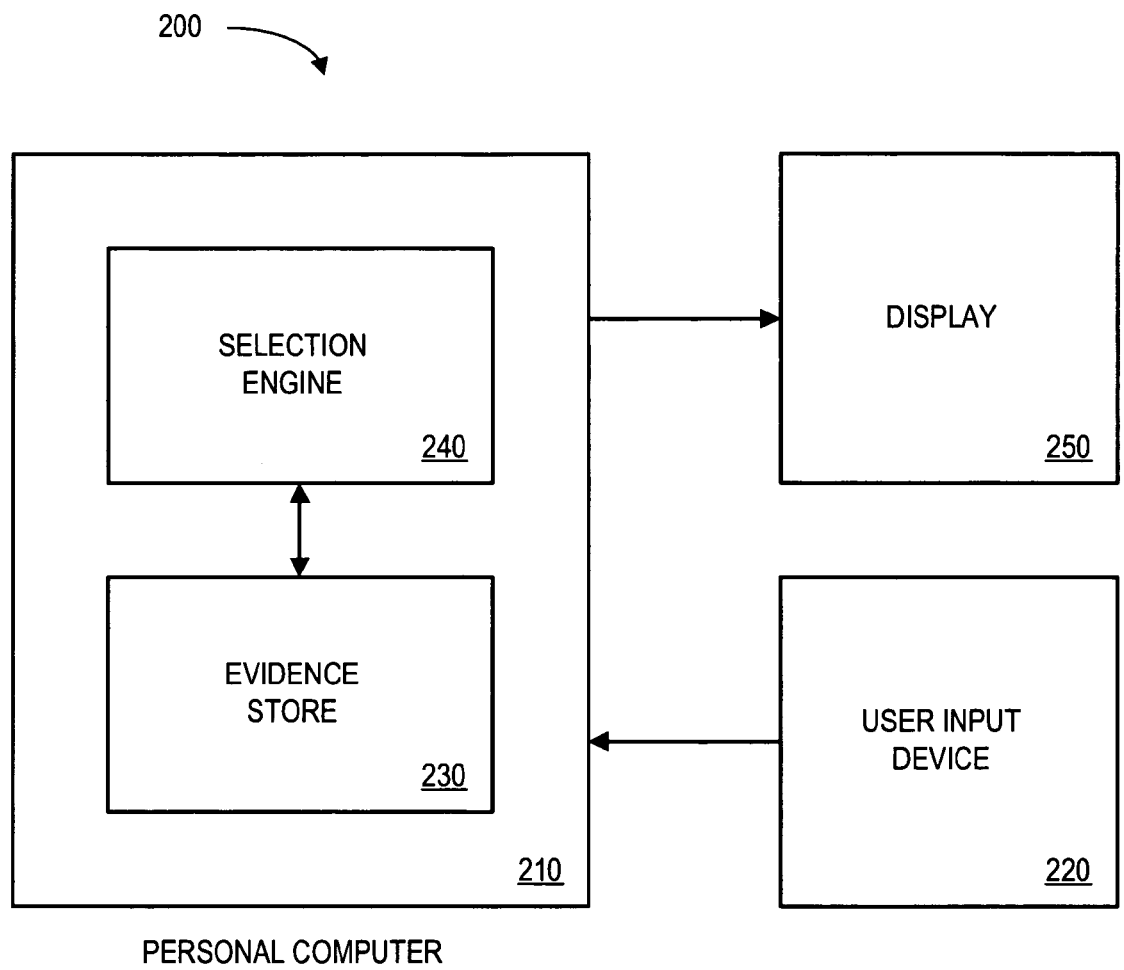
FIG. 2 is a block diagram of a system according to some embodiments.

FIG. 2 is a block diagram overview of a system 200 according to some embodiments of the present invention. The system includes a personal computer 210 (e.g., including one or more INTEL® Pentium® processors) and a user input device 220 (e.g., a computer keyboard or mouse). A user could use the input device 220, for example, to open an email message.

The personal computer 210 includes an evidence store 230 that stores information associated with relatedness between data objects. For example, each entry in the evidence store 230 might indicate that a particular pair of data objects should (or should not) be considered to be related. The evidence store 230 may be associated with any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The personal computer 210 further includes a selection engine 240. When it is determined that a user is interested in a first data object (e.g., he or she opens an email message), the selection engine 240 may access information from the evidence store 230 to select other documents that may be related to the first data object.

Figure 3:
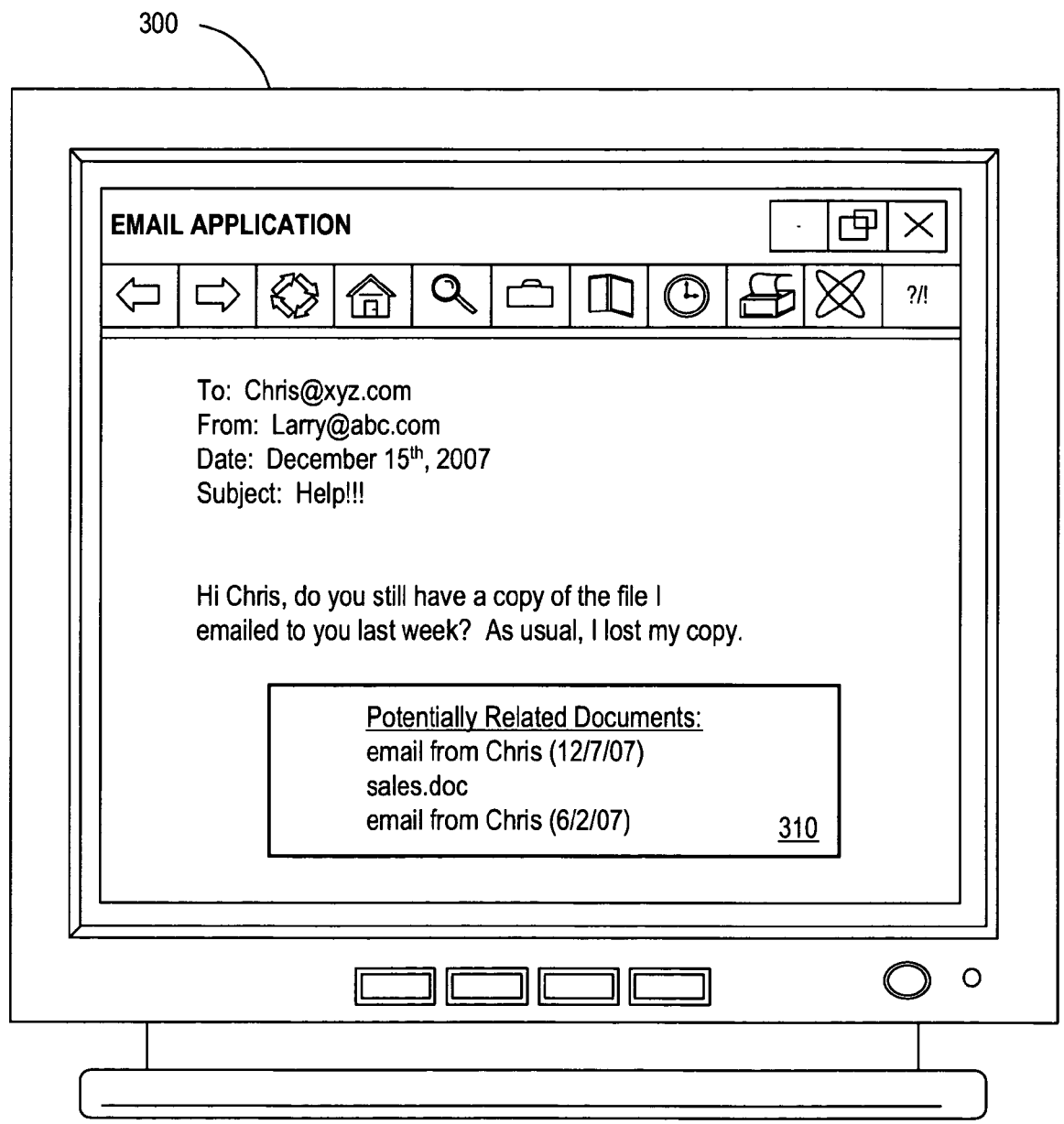
FIG. 3 is a display according to some embodiments.

A display device 250 (e.g., a computer monitor) may then be used to present indications of the related data objects to the user. For example, FIG. 3 is a display 300 according to some embodiments. In this case, the display 300 includes an area 310 in which potentially related documents are listed. In particular, because the user is reading an email message from "Chris@xyz.com," the selection engine 240 has listed three data objects (two email messages and a sales document) that might be related to the particular email message being read by the user. According to some embodiments, a "ranking" number may be displayed next to each indication of a potentially related data object.

Note that in some embodiments described herein, computer applications and peripherals are monitored in order to detect when a significant event on a data object has occurred. Each relevant data object is stored in a database that uniquely identifies the entity in the system. Properties of the data object could include the display name, storage location, globally unique identifier, summary information, and/or timestamps. Monitoring of applications and peripherals might be accomplished through software components that are able to interact with the monitored applications to determine when a data object has been operated on. When such an event is detected, the software component might notify the system that an important "action" has taken place on a specific data object.

An "action" may be, for example, a notification message indicating that a data object on the computing system has been manipulated in a significant way. Types of actions might include, for example: opening a data object, closing a data object, activating a data object, deactivating a data object, copying data to/from a data object, creating a data object, deleting a data object, renaming a data object, or making a copy of a data object.

While a user interacts with various applications (and the underlying data objects), the monitoring components might continually detect and send corresponding actions into the system. An action may also result from receiving a signal from an external peripheral or server, such as receiving an incoming phone call or receiving a new message that may be stored on a server.

Figure 4:
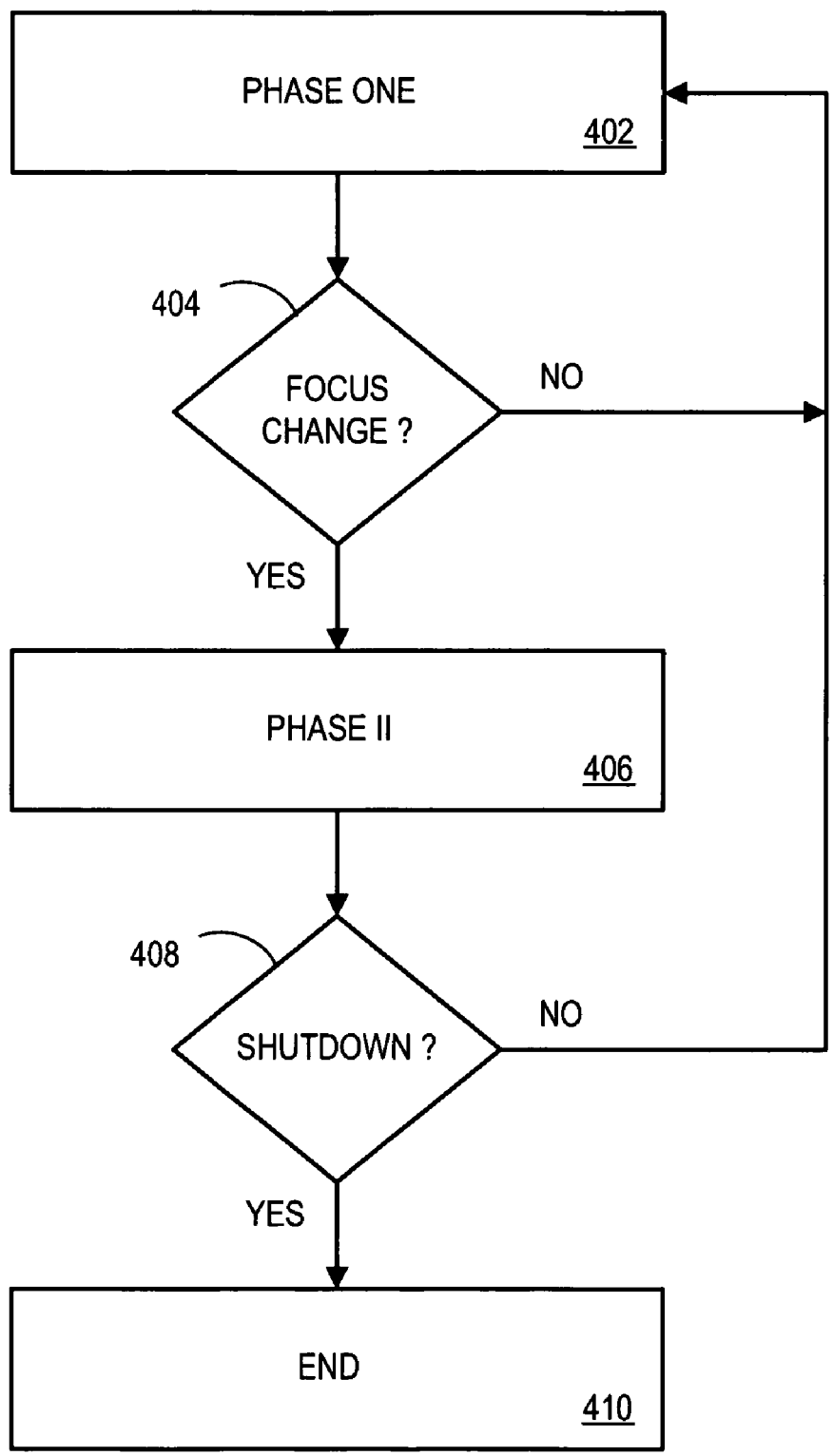
FIG. 4 is a flowchart of an action processing method according to some embodiments.

Actions may be used for two purposes and may be processed in two phases. For example, FIG. 4 is a flowchart of an action processing method according to some embodiments. At 402, "Phase I" processing may be performed. During Phase I, actions may be analyzed to determine if any two data objects are associated in some way and the evidence connecting them is recorded. One embodiment of Phase I processing is provided with respect to FIG. 5.

When no focus change is detected at 404, Phase I processing continues. When a focus change is detected at 404, "Phase II" processing may be performed at 406. During Phase II, an action may act as a signal to initiate a retrieval of relevant information based on accumulated evidence gathered during previous iterations of Phase I. Phase II may be, for example, initiated if an action corresponds to a change of use focus, such as when a new application is activated. One embodiment of Phase II processing is provided with respect to FIG. 7. If Phase II indicates that a shutdown is appropriate at 408, the method ends at 410.

Figure 5:
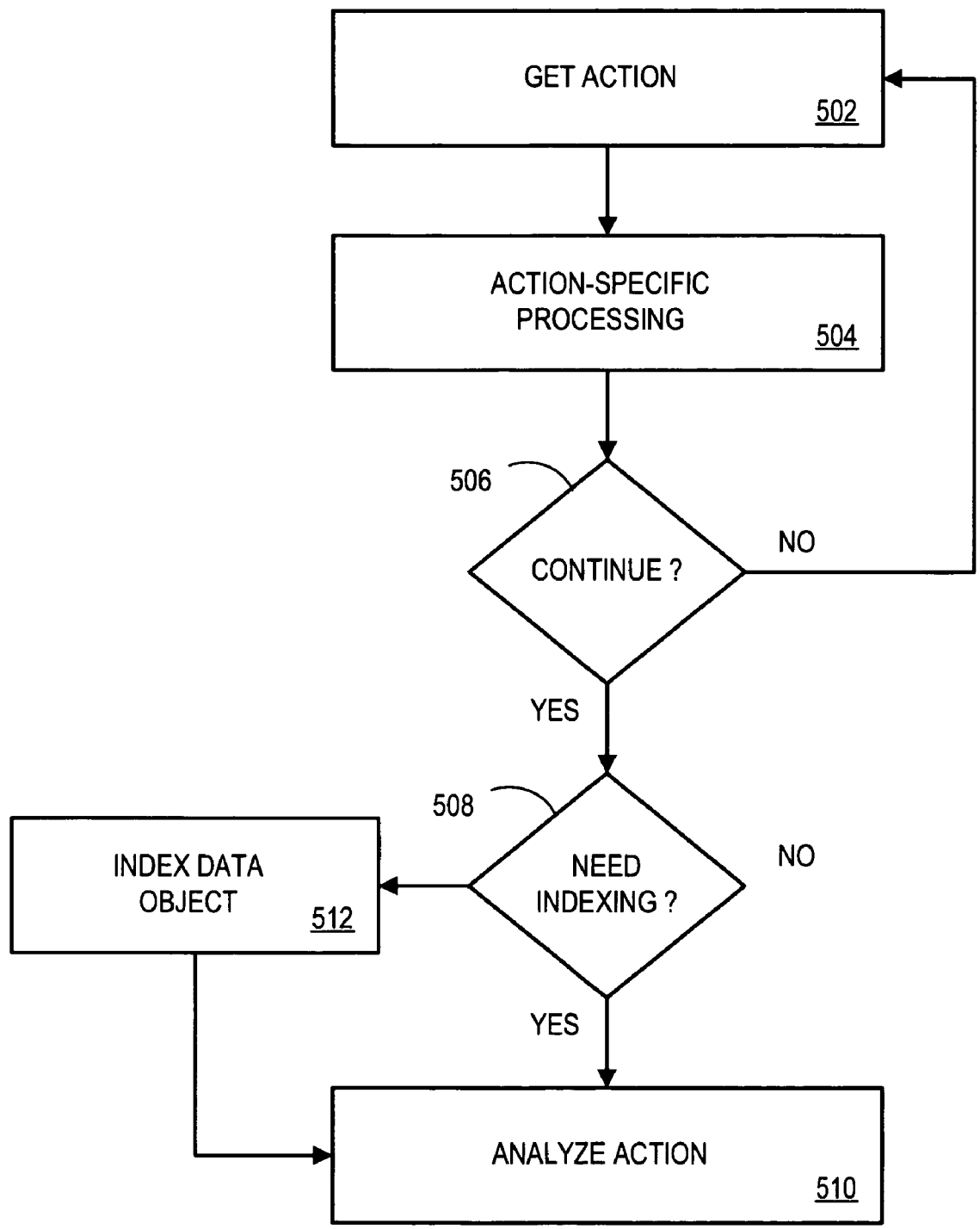
FIG. 5 is a flowchart further illustrating action processing according to some embodiments.

FIG. 5 is a flowchart further illustrating Phase I action processing according to some embodiments. Note that once an action has been generated by a monitoring component, it may be queued up by the system. The system might sequentially retrieve actions from this queue at 502 and processes them in Phase I. The flow chart shown in FIG. 5 describes the steps that are taken, according to one embodiment, to process an action in Phase I.

At 504, action-specific processing may first be applied based on the type of action that was retrieved. For example, an action that specifies that a data object has been deleted from the operating system may remove the data object from any databases. The pre-processor may additionally specify if the action should be processed further. If no further processing is necessary at 506, as might be the case for a deletion action, processing is complete and the system can process the next action at 502.

If further processing is appropriate at 506, the system may decide at 508 if the data object should be indexed. Indexing at 512 might involve, for example, extracting any important terms from the contents of the data object and storing the terms into an index database for the purpose of comparing data objects for term similarity and performing searches to find data objects containing specific terms. A data object might be, for example, indexed if the contents have changed since the last time the system indexed the data object, or if the data object is new and is not yet stored in the index database.

If no indexing was required (or after indexing is performed), the action may be analyzed at 510 to determine if any association between data objects can be inferred based on the action that has occurred. Any inferred relationship may be recorded as "evidence" into a database or "evidence store."

Evidence may be, for example, any information that associates two data objects in some way. FIG. 6 illustrates information in an evidence store 300 according to some embodiments. The illustration and accompanying description of the database presented herein is exemplary, and any number of other database arrangements could be employed besides those suggested by the figure.

Referring to FIG. 6, a table represents the evidence store 600 that may be stored at a personal computer or on a network-accessible device according to an embodiment of the present invention.

Each piece of evidence might consist of two data object identifiers 602, 604 and four properties, which include a type 606, weight 608, confidence 610, and count 612. The "type" property 606 might be a general descriptor of the evidence that identifies how the two data objects are connected. Each type 606 of evidence may have a corresponding "weight" 608 specifying how important different types of evidence are for determining relevance. The "confidence" property 610 might signify how reliable the particular instance of evidence is thought to be. For many types of evidence, a maximum confidence value 610 could be used because the generated evidence can be reliably determined. However, evidence may have a confidence value 610 less than the maximum. For example, in considering associations based on the contents of two documents, the amount of similar words and importance of the words appearing in both documents can affect the degree of similarity, and thus the confidence 610 that the two data objects are related. The count property 612 might specify how many times a type of evidence has been generated between two data objects. The count value 612 might be incremented each time an identical type of evidence is generated between two data objects 602, 604 for which evidence already exists.

Analyzers may be software components that are responsible for discovering a specific type of association between data objects. If such a relationship is found, the analyzer may generate new evidence and record it into the evidence database 600. The system may contain, for example, a core set of analyzers that implement the basic evidence-generation logic. According to some implementations, however, this core set may serve as a foundation for building more complex application-specific analyzers. Some examples of analysis include:

1. Toggle Analysis
    a. Analysis: identifies alternating activation patterns of application windows.
    b. Evidence: associates two data objects where the application windows in which they are hosted have been given focus in sequence.
    c. Rational: toggling back and forth between two applications may signify that the user is referring to multiple data objects during work on a single task.
    d. Category: usage evidence.
2. Simultaneous Use Analysis
    a. Analysis: identifies when two applications are being used at the same time. For example, if a document is opened during a telephone call, it may be related to the person on the call.
    b. Evidence: associates two data objects that are used at the same time.
    c. Rational: using two data objects at the same time may be an indication that the two data objects are being used to complete a single task.
    d. Category: usage evidence.
3. Collocated Files Analysis
    a. Analysis: identifies when data objects are stored in the same location.
    b. Evidence: associates two data objects that are located in the same container (e.g., email messages in a folder).
    c. Rational: users often organize information into hierarchical folder structures, with related items residing in the same folder.
    d. Category: storage evidence.

4. Content Analysis
  a. Analysis: identifies data objects that have many of the same words in common. Several different standard information retrieval techniques might be employed to estimate how similar two entities are in content. Some embodiments may use the Term Frequency Inverse Document Frequency (TFIDF) algorithm with cosine similarity measure.
  b. Evidence: associates two data objects that have some important terms in common.
  c. Rational: data objects with similar content may be related to the same task.
  d. Category: content evidence.
5. File Version Analysis
  a. Analysis: identifies if two data objects are versions of one another. This might be inferred from the naming convention, the similarity of contents, and/or their location.
  b. Evidence: associates two versions of the same data object.
  c. Rational: versions often have similar content, reside in the same location, and/or have permuted names.
  d. Category: usage evidence.
6. Email Thread Analysis
  a. Analysis: identifies if an email message is part of a threaded conversation.
  b. Evidence: associates two data objects where the data objects are email message that are part of the same thread.
  c. Rational: messages within the same thread are often related to the same topic.
  d. Category: content evidence.
7. Dwell Time Analysis
  a. Analysis: determines how long a data object was active while it was opened by the user.
  b. Evidence: associates a data object to itself and gives higher importance for longer activation time.
  c. Rational: data objects that are active for a longer time may have more importance.
  d. Category: usage evidence.
8. Copy Content Analysis
  a. Analysis: identifies the source and destination of copying content (text, images, tables, cells, etc.) between data objects.
  b. Evidence: associates two data objects where content is copied from one data object to another data object.
  c. Rational: including content from one document into another may indicate the information sources are related.
  d. Category: usage evidence.
9. Copy Data Object Analysis
  a. Analysis: identifies when a data object is copied to create a new data object instance. For example, documents are often created by using an existing document as a template.
  b. Evidence: associates two data objects where one data object is copied to create a new data object.
  c. Rational: the original source of a data object may be relevant to the new instance of the object.
  d. Category: usage evidence.
10. Email Attachment Analysis
  a. Analysis: identifies attached documents to an email message.
  b. Evidence: associates two data objects where one data object is an email message and the other data object is a document attached to the message.
  c. Rational: documents attached to a mail message may be related to the message.
  d. Category: storage evidence.
11. Saved Attachment Analysis
  a. Analysis: identifies when an email attachment is saved to disk or other store.
  b. Evidence: associates two data object where one data object is an email message and the other data object is a document attached to the message that is stored on disk or in a store.
  c. Rational: the on-disk copy and the mail message to which it was originally attached may be relevant to one another.
  d. Category: usage evidence.
12. Attached Document Analysis
  a. Analysis: identifies when a document is attached to an outgoing email message.
  b. Evidence: associates two data objects where one data object is an email message and the other data object is a document that originally resides on disk or in a store and is attached to the message.
  c. Rational: same as above.
  d. Category: usage evidence.
13. Navigation Analysis
  a. Analysis: identifies when a user selects a hyperlink in a Web page or rich text document.
  b. Evidence: associates two data objects where one data object contains a hyperlink and the other data object is pointed to by the hyperlink.
  c. Rational: the original creator of the content explicitly placed a hyperlink to allow the user to navigate to new content because there is some connection between the two data objects.
  d. Category: usage evidence.
14. Printing Analysis
  a. Analysis: identifies when a document is printed.
  b. Evidence: associates a printed data object to itself to give it higher importance.
  c. Rational: printing a document may indicate importance since the user had taken the effort to create a hard copy of the document.
  d. Category: usage evidence.

Note that some evidence may not need to be stored in the form of evidence, but might be calculated or retrieved as needed through other means. For example, collocated file analysis might determine which data objects reside in the same container and generate evidence connecting each data object with every other data object in the same location. This evidenced could be determined by storing a container identifier (e.g., associated with a folder in which the data object resides) with each data object and using that identifier to find all data objects that reside in the same container. With this technique, the system might store less evidence and save space in the evidence database.

Referring again to FIG. 4, if an action signifies a change of user focus at 404 (e.g., when a user activates a window containing a document in a word processor application), Phase II processing may be performed. In general, the system may build a list of relevant and related data objects and notify any components of the updated information. The system may use the collected evidence to build an ordered list of other data objects relevant to the target data object. The task of building this list may determine i) which data objects are relevant and ii) how to order the data objects in the list so that the most relevant objects are closer to the top of the list.

Figure 7:
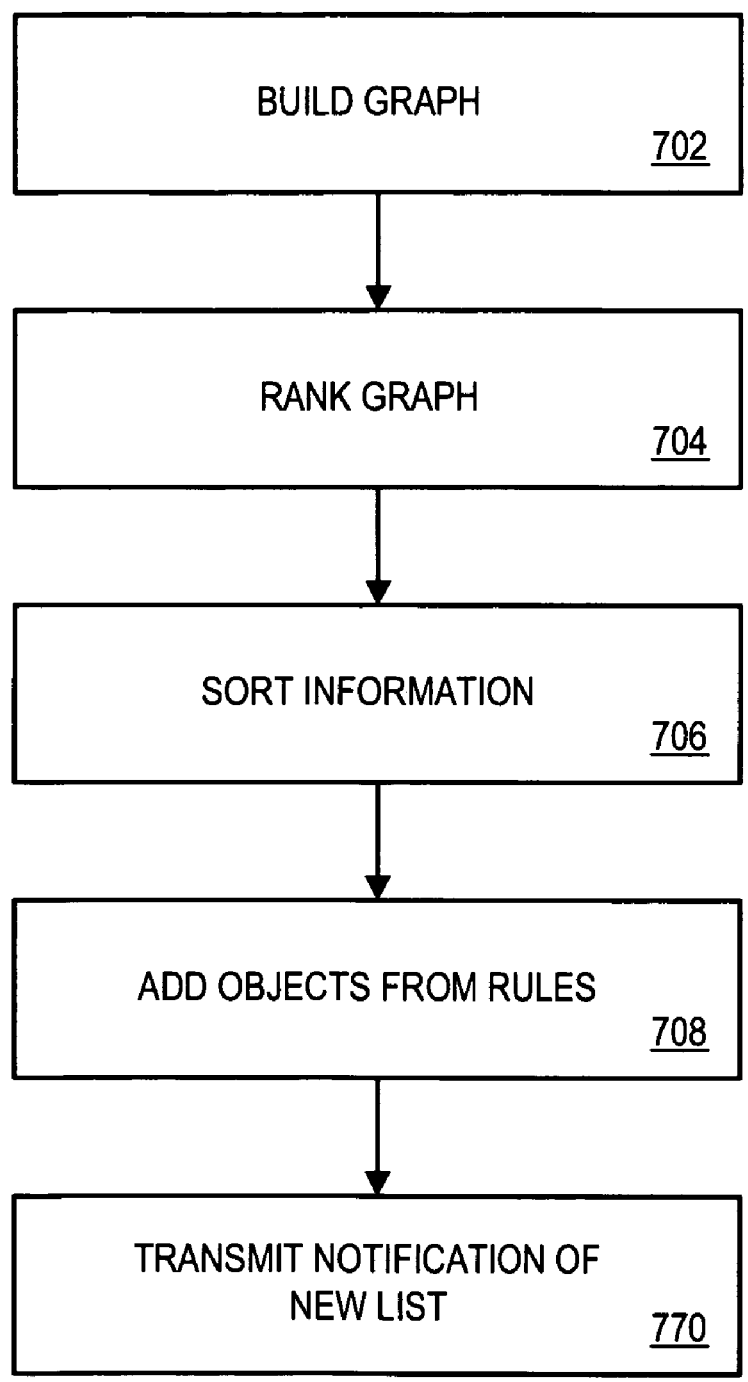
FIG. 7 is a flow chart illustrating action processing according to some embodiments.

For example, FIG. 7 is a flow chart illustrating one embodiment of Phase II action processing. At 702, a "graph" of appropriate data objects may be built. That is, building the list of data objects relevant to the target might involve creating a graph where nodes consist of potentially relevant data objects and edges are the collected evidence that associate data objects.

Figure 8:
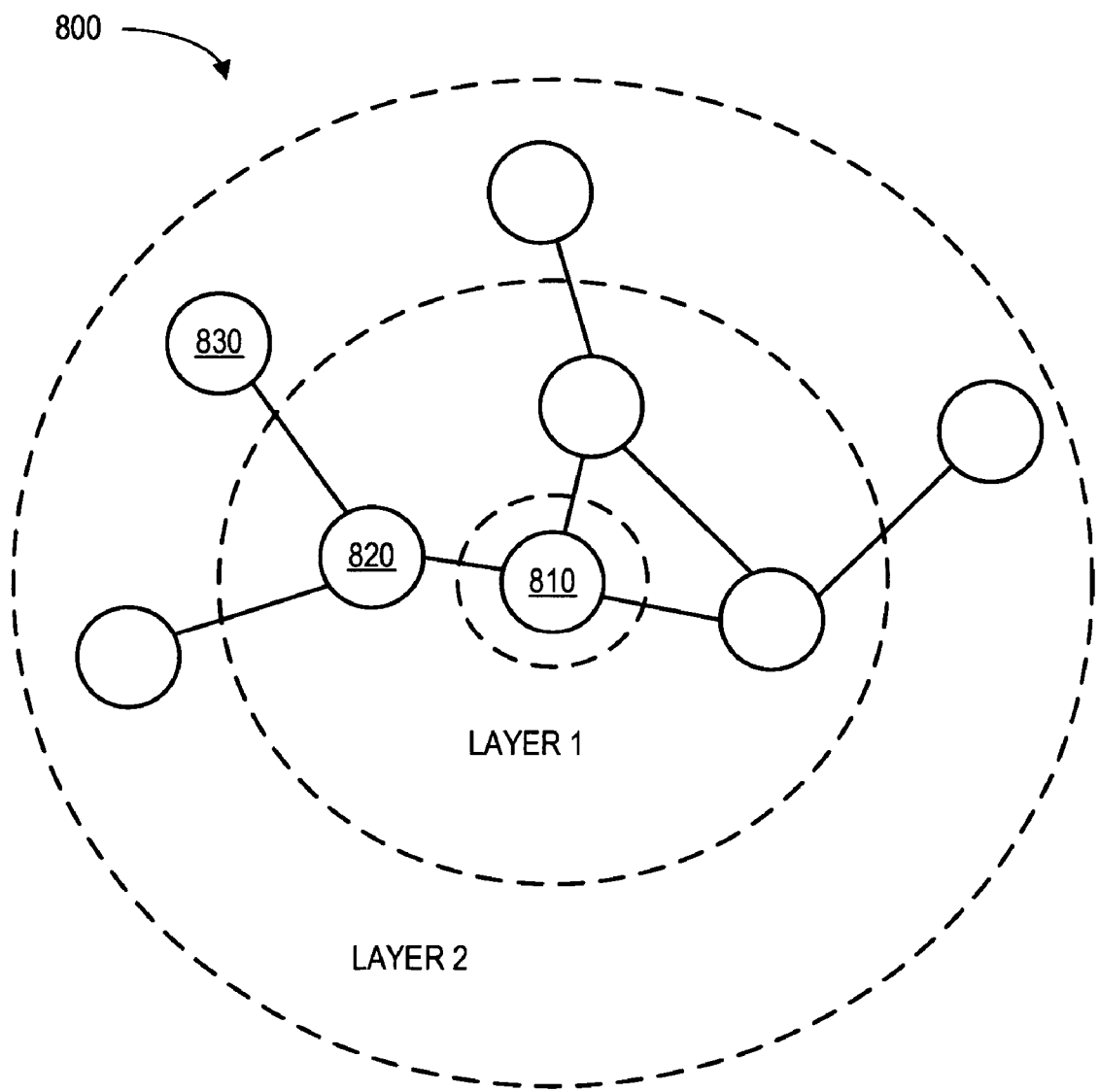
FIG. 8 is layered graph construction according to some embodiments.

FIG. 8 is layered graph construction 800 according to some embodiments. Note that other implementation techniques could be used, such as by using a matrix instead of a graph. Graph construction may proceed in layers, with the graph initially consisting of a single node, the target data object. For each layer, evidence may be found in the database that connects nodes that are already contained in the graph to nodes that are not in the graph yet. When such evidence is found, the new data object may be added to the graph, with an edge connecting the two data objects that correspond to the evidence. The process is continued for some finite number of layers.

Including more than a single layer in the graph results in finding potentially relevant data that may not be directly relevant to the target, but that may be indirectly connected. The graph 800 illustrates two layers of connectedness from a data object of interest 810. That is, data object 820 is directly linked to the data object of interest 810 (and is thus in layer 1) while data object 830 is only linked to the data object of interest 810 through data object 820 (and is thus in layer 2).

When all data objects are identified, they may be sorted from most relevant to least relevant using any one of several ranking algorithms. For example, a simple algorithm may make all data objects found in iteration n more relevant than data objects found in iteration n+1. More complex algorithms may rank data objects based on the degree of relevance between any two data objects using some weighting scheme. In this case, edges in the graph 800 may then be weighted. In one embodiment, this weight is a combination of the different evidence connecting two specific data objects, that is, the sum of the number of collected evidence of each type times its weight factor (note that although a single line is illustrated as connecting any two data objects in FIG. 8, that line might represent multiple entries in an evidence store 6). The weight factor may be the product of the evidence weight, confidence, and count associated with that evidence:

$$weight_{edge} = \sum_{e \in evidence} weight_e * confidence_e * count_e$$

Note that different graph building techniques may be used based on the type of the target data object to help the results better match what information a person may require when accessing a particular type of data object. Building the graph 800 may differ, for example, in the number of layers, type of evidence included in each layer, order in which the types of evidence are added to the graph 800, addition of data objects based on predefined rules, conditions for adding specific evidence, and stopping conditions.

Referring again to FIG. 7, determining the degree of relevance of each data object to the data object of interest 810 or "target" may be calculated at 704 by running an algorithm over the graph 800 that takes into account the type and amount of evidence connecting all the nodes. The algorithm may result in each node being assigned a rank, from which the data objects can be sorted at 706 and thereby ordered by degree of relevance to the target data object. Note that in some embodiments, weights can also be negative, reducing the association between documents.

According to some embodiments, evidence is bi-directional; that is, edges between nodes might initially do not point in any specific direction. The first step in ranking the nodes may be to make the graph 800 directed by forcing all edges to point towards nodes in an equal or lower layer (i.e., layer 2 nodes should point to layer 2 or layer 1 nodes). Next, each node in the graph might be scored using the following formula:

$$score_{node} = \sum_{e \in edges} weight_e$$

Figure 9:
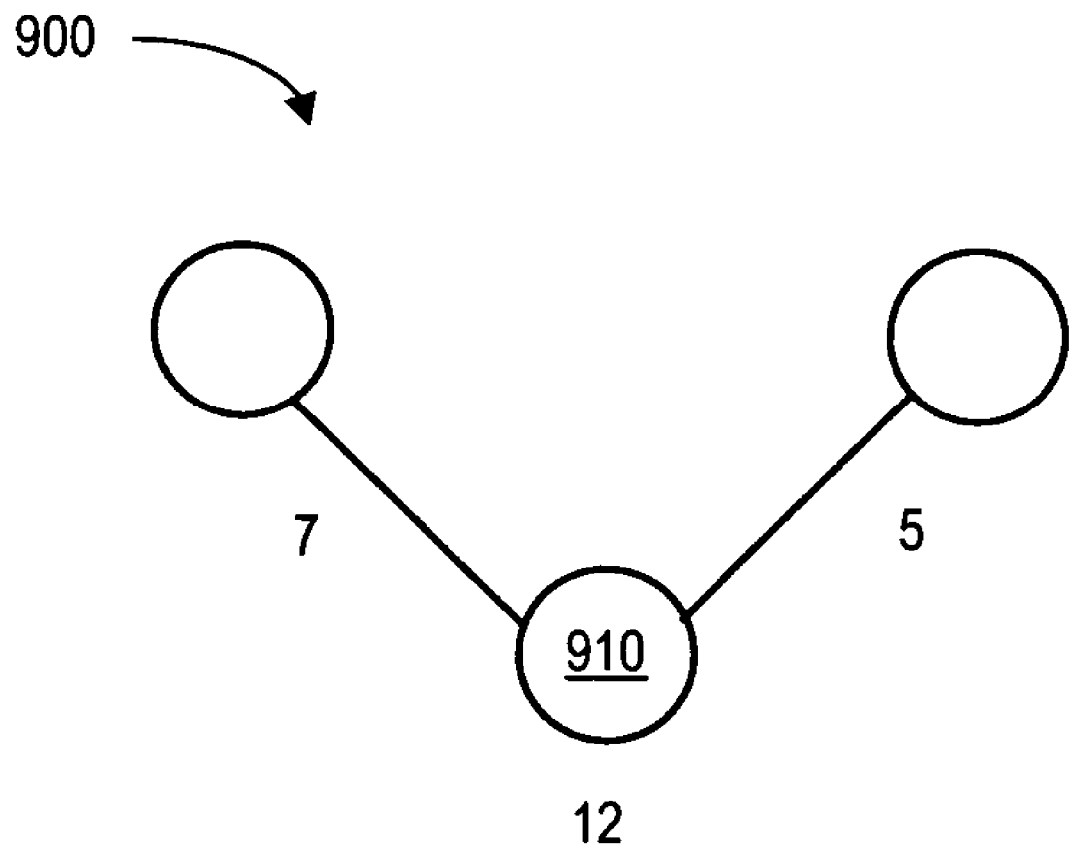
FIG. 9 illustrates relationships between data objects according to some embodiments.

FIG. 9 illustrates relationships 900 between data objects according to some embodiments. In particular, a node 910 may be scored with two connected nodes with link weights of 7 and 5, resulting in a score of 12.

Next, the rank for each entity node may be calculated:

$$rank_{node} = \sum_{e \in edges} (damping_{e.node} * rank_{e.node}) / (weight_e * score_{e.node})$$

According to some embodiments, this equation is solved by iterating until the ranks for each node do not change beyond some threshold. The damping factor may be, for example, used to weigh nodes farther away from the target data object with less value. The algorithm uses the edge weights of connected nodes to determine the rank value from which an ordering may be assigned.

According to some embodiments, a subset of data objects may be grouped together if there is a specific relationship between them. For example, if there is high confidence of "file version evidence," implying that the two data objects are likely different versions of the same file, one of those data objects may be chosen to represent the group. According to some embodiments, the choice to have such objects grouped is a user-configurable setting.

This method describes a way to determine data objects relevant to a given target data object through the use of collected evidence. Referring again to FIG. 7, a further method of determining relevant data objects may be through a defined set of rules at 708. These data objects might not be included in the relevance graph and may be derived from any source. As such, they might not be ranked (and therefore may be ordered in any way) and would not affect the results of relevant data objects determined from graph construction.

Such rules may be based on the type of the target data object and could be evaluated when the target data object changes (e.g., the user changes focus). Rules may take the target data object and determine any other data objects that are related based on a defined expression, such as querying a database for specific information. For example, an incoming phone call may trigger a rule to display recent email messages from the caller.

Application of a rule might require a person, company, or other entity to be first associated to one or more data objects. A person, company, or other entity may be represented by a contact entry data object, such as a record in any contact management application (e.g., email application, phone application, or customer relationship management application), customer record, or entity identifier. Based on the entity, other relevant data objects may be determined, either in real-time or by retrieving them from a database, server, or application. Some examples of rules may be:

1. Recent email—find information about email messages that has been received from a particular person. This list might be limited by time or length.

2. Email thread—find information about email messages that are part of an email conversation with one or more people. This list might be limited by time or length.

3. Recent phone call history—find information about times of recent telephone conversations to/from a person. This list might be limited by time or length.

4. Recent instant messages—find information about recent instant message archives from a particular person. This list might be limited by time or length.

5. Recent attachments—find information about attachments that have been received from a particular person. This list might be limited by time or length.

6. Contact information—find information about a particular person, such as email address, phone number, home address, business address.

7. Appointment information—find information about appointments in the near future regarding a particular person.

If an action specifies a change of user focus, such as activating a new application window, the system may notify any registered components that a new data object has become the target and that the list of relevant data objects has been recalculated. The complete list of relevant information can then be used by any other program.

In one exemplary embodiment, the target data object and the list are displayed in a GUI where each data object is displayed with a readable name and may be accompanied with a hyperlink that allows the data object to be accessed, together with a set of options to perform specific actions on the data object. Some examples of GUIs are described with respect to FIGS. 14 and 15. Through the graphical interface, actions might be performed on the data objects, such as opening one or more data objects, performing a search on a data object (e.g., treat it as a target data object), or removing a data object from the system databases.

In another embodiment, any registered component receives the list of relevant data objects through a programmatic interface, for example as a list of data objects containing the characteristics of the relevant objects.

Note that usage analysis may involve identifying patterns in the stream of recent past actions. Since the proper operation of the analyzer components may depend on the action stream being well formed, the system might ensure that the sequence of actions is in correct order. In some cases, application monitoring components might send incorrect actions into the system, either due to improper implementations or incorrect action order provided by the native applications being monitored. As a result, the system may need to insert or remove actions into the stream to guarantee appropriate form.

A well formed action stream from an application monitor might take the form, for example: open, activate, <deactivate|activate>, deactivate, close, which corresponds to the underlying data object being opened, activated/deactivated as the user gives focus to other applications, and closed, respectively. According to some embodiments, the system employs the following set of rules to help ensure that the stream is well formed:

1. An activate action should follow an open action.

2. An open action should be preceded by a deactivate action.

3. An activate action following an open action should encompass the same data object.

4. An activate action should be ignored if the data object is active.

5. A deactivate action should be ignored if the data object is not active.

6. An activate action should be ignored if the data object is not open.

7. A deactivate action should be ignored if the data object is not open.

8. A close action should be ignored if the data object is not open.

According to some embodiments, the system maintains several historical lists of past actions so that analyzer components may inspect the actions and detect patterns.

According to some embodiments, when a hyperlink corresponding to a data object is selected, the default action is to instruct the system to open the data object within its native application. However, if a data object resides in a database or requires a special application to access it, selecting the hyperlink can instruct the system to communicate with a registered application to perform a custom action. This method may cover, for example, accessing email messages in a messaging application, personal contact information in an personal organizer application, appointments in a calendar application, records in a customer management application, placing phone calls, retrieving caller history records, and/or any other process that might be used to manipulate data objects. For example, if the telephone number of a person is presented as a relevant data object, selecting the number in the display may contact a Voice Over IP (VOIP) software phone running on the computer system and place a telephone call to that person's telephone number.

Figure 10:
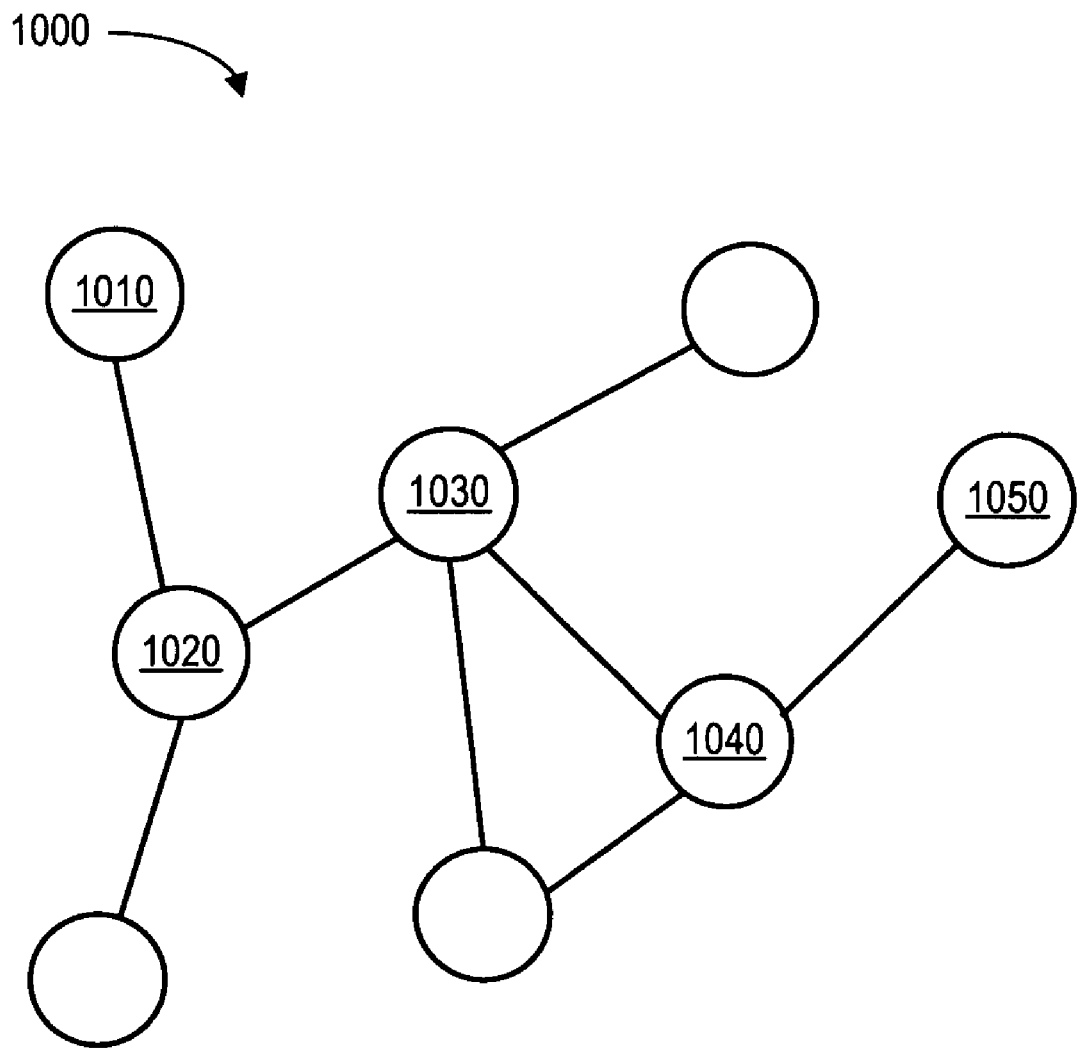
FIG. 10 illustrates indirect relationships between data objects according to some embodiments.

Relevance of information to a target data object may be determined from collected evidence. If a layered graph is used to determine relevance, data objects may be related through "indirect" connections (there need not be evidence directly connecting two data objects to signify that they are relevant to one another). For example, FIG. 10 illustrates indirect relationships between data objects according to some embodiments. In particular, data object 1010 is related to data object 1050 only through three intermediate data objects 1020, 1030, 1040.

These indirect relationships may be in contrast to other approaches that only use content to determine relevance through common terms. In such approaches, documents may be directly related via identical (or similar) words that appear in a collection of documents. However, allowing data objects to be connected through several levels of indirection might bring in information relevant to a context that an approach using only direct associations would miss.

Allowing indirect data objects to be included in the list of relevant data objects can extend the usefulness of an application as opposed to simply including directly relevant data. For example, if a data object is part of a communication, such as an email message, a person can be associated to the data object. If such an email message contains an attached document that the user saves to disk, accessing the saved document may result in a list of relevant data objects that includes the original email message. Since a person can be associated to the email, information about the person may also be included into the list, from which a program may allow a user to easily contact the person through some external communications application such as a telephony application or device.

According to some embodiments, a data object that is displayed in the list of relevant objects may be used to initiate a further search for relevant information. This can be done to find a data object that is not yet in the list, but the user feels is relevant to one of the data objects that is in the current list.

Figure 11:
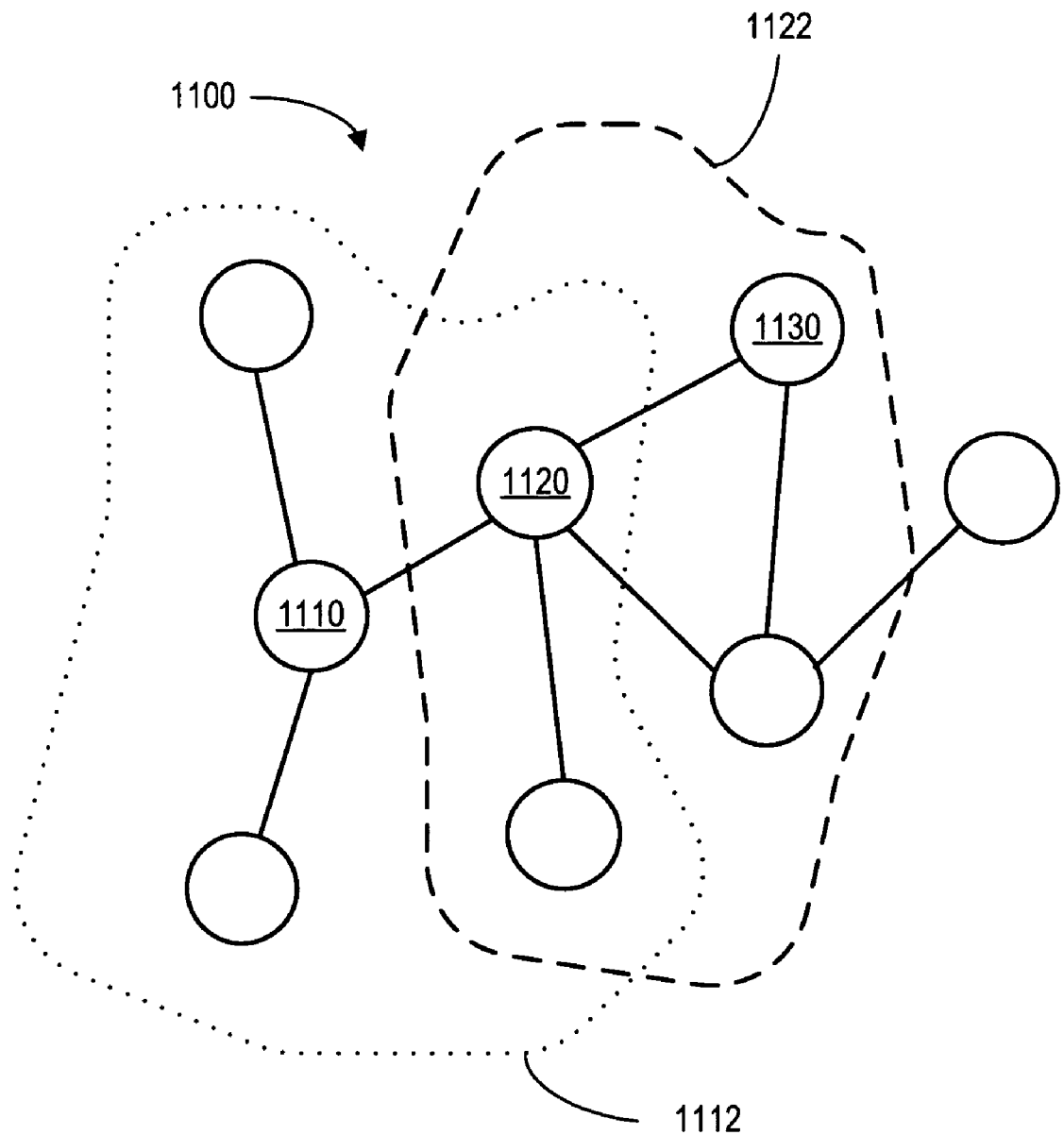
FIG. 11 illustrates an evidence-based search according to some embodiments.

FIG. 11 illustrates an evidence-based search 1100 according to such embodiments. A first data object 1110 is opened by a user, and a first set of potentially related data objects 1112 is selected by the system and displayed to the user. The user does not find the data object 1130 that he or she actually needs, but does notice a second data object 1120 that seems more related to 1130 than the first data object 1110. The user can instruct the system to make that second data object 1120 the new target data object. As a result, a new set of potentially related data objects 1122 is selected by the system and displayed to the user. The user will now see the data object 1130 that is actually of interest.

For example, a user may be working on a document, for which the systems calculates other relevant documents. If the person is looking for a particular document that does not appear in the list, but feels is relevant to one of the items in the list, the user can select a special hyperlink of the item, causing it to become the target data object, resulting in a new list of relevant documents to be calculated and displayed. As a further example, suppose a user is looking for a particular email message. Perhaps a keyword search results in finding a document that was attached to the desired email. The user could then perform a search based off the located document by selecting the provided special hyperlink, causing the email to be displayed because evidence connects the email with the attachment. With this method, users may follow evidence paths to locate information based on context rather than content without entering keyword search terms.

Evidence may serve as the basis for determining data object associations. According to some embodiments, several methods are possible to generate evidence for different purposes.

For example, real-time evidence creation may be provided. In this case, processing of actions may occur as the user interacts with data objects. However, evidence might be generated as part of a background process (when the user is not actively using the system). When the system remains idle for some time, a background process may loop over available data objects and create a pseudo action encapsulating the data object, which can be processed in Phase I as if it were generated by the user accessing the data object for the first time. Similar to real-time action processing, pseudo actions may be content indexed and analyzed for evidence generation.

As another example, manual evidence creation may be provided. Typically, evidence may be generated when the system determines that there is an association between two data objects. However, there may be times when a user wishes to explicitly associate two data objects with each other (to increase the likelihood that a data object will appear in the calculated relevance list, or to increase the rank of a data object). For example, suppose a user is working on a document and wishes to associate some contact information to the document so that it is readily available the next time the document is worked on. This in effect may add a "bookmark" to the document, where the bookmark entity can be any type of data object.

According to some embodiments, a tool is provided which allows the user to create evidence by selecting the two data objects that are to be associated with each other. For example, the user might click an icon representing one data object and then click a different icon representing another data object. Such an action may manually create or increase an association between the two data objects. The tool might be used to manually delete associations between data objects which appear unhelpful.

According to some embodiments, the system periodically (on a synchronous or asynchronous basis) deletes evidence from the evidence store according to pre-determined and/or user-configured rules. Some examples of rules may include:
Delete evidence that was created before some time in the past.
Delete evidence when one data object is connected to too many other data objects.
Delete evidence when two data objects are determined to be versions of each other.
Delete evidence when the contents of a data object has changed that would invalidate previously generated evidence.

In some cases, data objects may be stored in a database and include a storage location and unique identifier. Since data objects may be created, deleted, copied, and moved, the system might ensure that the location information of the data objects stored in the database are kept synchronized with the real locations (to maintain the integrity of the stored evidence). If the stored location and real location of a data object are not synchronized, selecting a hyperlink may result in an error because the system would not know how to find the data object and take action on it. According to some embodiments, the system keeps track of the locations of data objects as users actively create, delete, rename, copy, and/or move them. As a result, the system is able to synchronize the location information in real-time. Other embodiments scan the existing data objects as a background process and synchronize any objects that have inconsistent location information in the database.

According to some embodiments, the process of synchronization is accomplished as follows. When a data object is processed, it may be looked up in the database using the unique identifier. If the data object is found, the location information is read from the database and compared with the real location information. If they are different, the location the location information in the database may be updated to the current real value.

Figure 12:
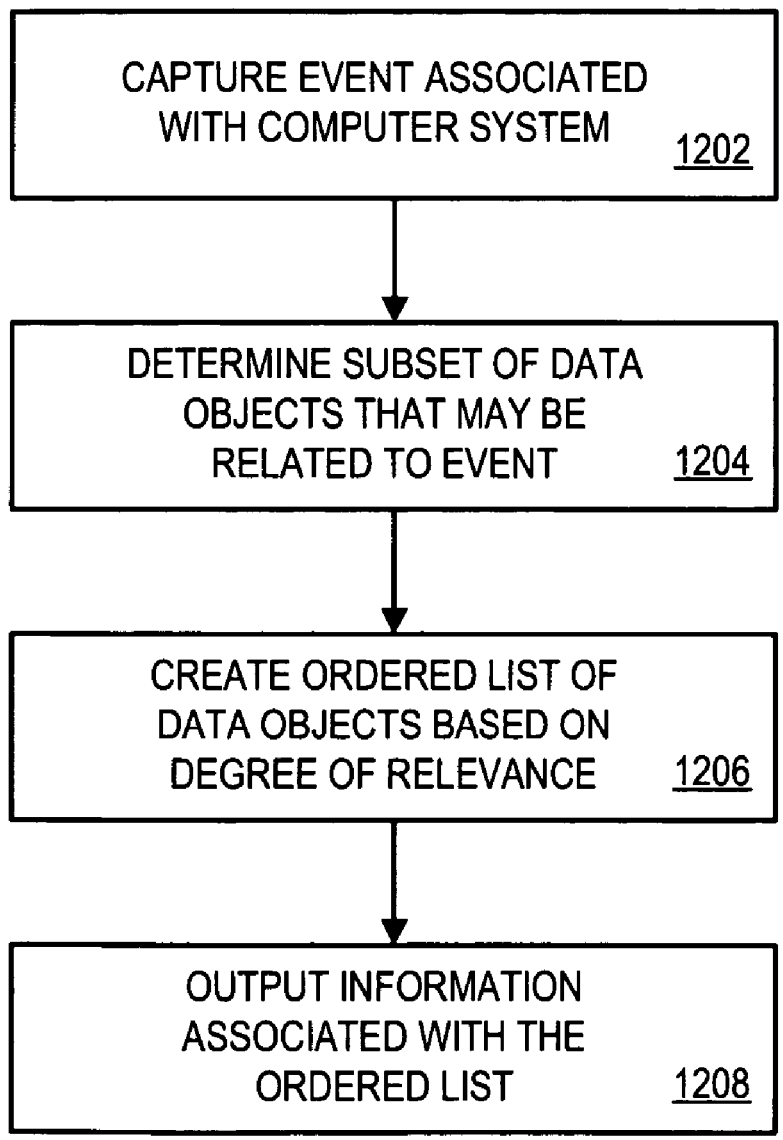
FIG. 12 is a flow chart illustrating a method according to some embodiments.

The presented invention describes how a system might retrieve and deliver context-relevant information and how a user might find such a system useful. FIG. 12 is a flow chart illustrating a method according to some embodiments. At 1202, an event associated with a computer system is captured. In some cases, the event might help a system determine what data objects may be of interest to a user.

In determining what information might be relevant to a user's context, exactly what constitutes the current context must be estimated. While this may be decided in many different ways, some embodiments of the present invention observe a person's current activities on a computer to assess what information may be most relevant to those activities. The current activity corresponds to the information source that the user is actively using or is about to use, which can be the data object in an application that the user is interacting with or a signal from a service, peripheral, or server, such as an incoming phone call notification from a private branch exchange. User activity may be inferred from events emanating from an application, service, peripheral, or server, such as when a data object inside an application is activated by the user. Note that the exact time when the context changes can differ based on the configuration of the system. For example, in considering a communications application, the context may change when the user acknowledges a communication request, such as picking up a ringing phone, or can change when the communication is first initiated, such as on the first ring, but before the recipient has decided to accept the communication. The same is true for communications initiated by the user, i.e., when a person places an outgoing call. The context can change when the user first selects a contact object in an application corresponding to a person they wish to call, when the call is initially dialed, or when the call is answered by the opposing party.

The data object corresponding to a context change may be referred to as a "trigger." For example, a phone number might be a trigger data object associated with a phone call notification event.

Each data object might contain several properties related to a piece of information. These properties may used to identify the information to the user and could include, for example:

1. Name—describes a readable name that is displayed to the user to help identify the data object.
2. Type—describes the type of data object. For example, a document on the local file system may be of type "file." Other types include, but are not limited to, "email message," "web page," "telephone call," "file folder," "email folder," "instant message," "contact," "appointment," and "record."
3. URL—describes the unique identifier of the data object used to access the source.
4. Rank—describes the degree of relevance between the given data object and the trigger data object.
5. Options—describes a list of actions that can be taken on the data object.

In response to a captured event (e.g., a new trigger), a subset of data objects that may be related to the event are selected at 1204. The subset of data objects might include data objects that are directly related to the trigger data object and/or ones that are indirectly related to the trigger data object through another data object.

A trigger data object represents the user's current context and therefore may be used as a starting point to find other relevant information that may be useful to the user. Some embodiments may construct a list of other data objects that are relevant to the trigger by using a database of pairs of data objects that are associated in some way (e.g., an evidence store).

After the relevancy list has been calculated, additional data objects might be included that may be useful to another program, thereby creating an auxiliary list of data objects. The auxiliary lists could then be merged with the relevancy list or passed as separate properties of the list.

In one exemplary embodiment, data objects related to people, companies, or other entities are calculated. Determining what entity might be most relevant to a data object can be useful. For example, a program might provide a way for a person to be contacted through a communications channel (e.g., via phone, email, instant message, or any other collaboration application), or when additional information about the person can be accessed (e.g., his or her co-worker, supervisor, or office assistant). One embodiment might scan the data objects comprising the trigger and relevancy list to determine if an entity can be associated with each object. Another embodiment might associate an entity to each data object the first time it is accessed and store the association between the data object and the entity into a data store.

For example, if the object is a type of communication (e.g., phone call, email message, or instant message), the sender or receiver might be used as the relevant person. The relevant person may be identified to be the sender (for incoming communications) or the receiver (for outgoing communications). Once a person has been associated to each object (note that for some data objects it may not be possible to identify an associated person), a list of relevant people can be created by gathering the unique person identifiers corresponding to the data objects in the trigger and relevancy list. From the person identifiers, extra information about the person can be obtained from an external source or a database, such as an interaction history (e.g., in a customer relationship management system or phone records), a phone number, a screen name or identifier, recent email messages, email messages that are part of a thread, recent instant messages, recent document attachments to communications messages, contact information, or scheduled appointments. This extra information can be turned into additional data objects to form the auxiliary list if all properties of the data object can be assigned, thereby enabling the person to be contacted or information about the person to be accessed. Note that these data objects may be generated on-the-fly or may be stored in a data store and retrieved.

These additional data objects might be indirectly related to the trigger data object, since the relevancy list contains data objects that are indirectly connected to the trigger. For example, consider an email message with an attachment that is received by a user. The recipient saves the attached document to a local store and begins modifying the document. Later, the recipient makes a new version of the document and it goes through several iterations. At some later time, the user returns to work on the latest version of the document, which therefore becomes the trigger. The relevancy list may contain the document versions, the email attachment, and the email message that the document originally arrived in. Since the email message is a communication, it can be associated to a person (e.g., the sender of the message). An embodiment could then display information about the person whenever a version of the document is being edited. For example, a telephone number could be displayed and be selectable to automatically contact the person through a telephony application. The document trigger might not be directly related to any person, but since it is indirectly relevant to the email message to which a person can be assigned, a relevant person can be estimated. In some instances, more than one person may be associated to the data objects in the relevancy list, in which case information about several people that are judged to be relevant to a data object may be displayed.

As another example of calculating additional data objects, note that most data objects have a location. For example, file objects may be located in file system folders, email message objects may be located in email folders, and Web page objects may be located in a domain. A data object location may itself a data object (e.g., having all the properties of a data object). The location may be directly obtained from the data object URL, such as for a file object. In this case, the location might be extracted by removing the file name from the full path, resulting in the parent folder. Some URLs may require further processing to determine the location of the data object. For example, an email message object may reside in an email folder on a server. If the server provides an appropriate application programming interface, it may be possible to query the server with the unique identifier of the email message and receive the unique identifier of the folder in which the message resides.

Finding the unique locations of the data objects and displaying them separately can be useful to a program that allows the data objects to be manipulated. The system in effect could provide some memory of where things have been stored in the past, which can make finding and storing items in the future more efficient. For example, take the case where two people are working on two different projects together and are corresponding via email messages. As each message is received, it is manually moved from the inbox to one of two email folders, one for each project. Whenever a message is received from the other party, the two folders could be displayed and a program could provide an interface to allow the new email message to be moved into one of the folders or for one of the folders to be opened to view its contents. Such a program is essentially taking the current context (based on the selected email message) and using it as a filter to decide which folders (out of a potentially large number of folders) may be most relevant to the current activity in order to simplify some tasks.

Referring again to FIG. 12, at 1206 a list associated with the subset of data objects is created. According to some embodiments, the list is at least partially ordered based on a degree of relevance between a data object in the list and the event. At 1208, information associated with the created list is output. For example, the information might be transmitted to another application.

Figure 13:
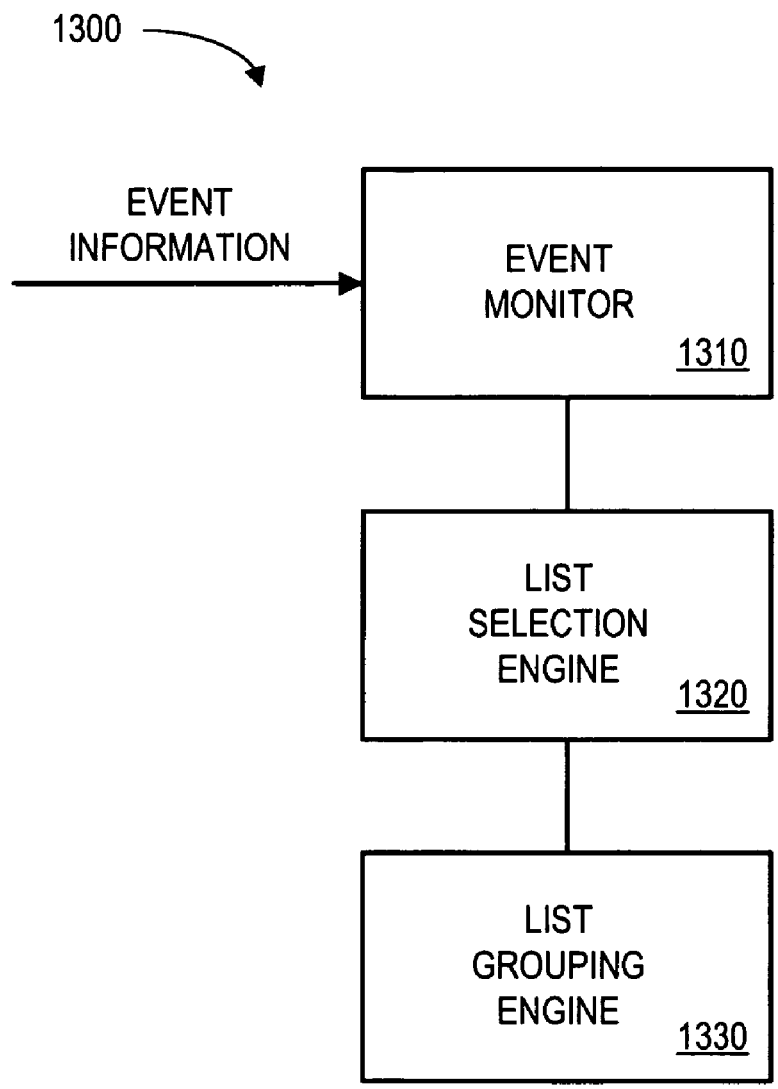
FIG. 13 is a block diagram of a system according to some embodiments.

FIG. 13 is a block diagram of a system 1300 according to some embodiments. In this embodiment, an event monitor 1310 may capture events associated with a computer system. A list selection engine 1320 may select a subset of data objects, and the list may be ordered based on a degree of relevance between a data object in the list and the event. According to some embodiments, a list grouping engine 1330 may further group objects in the list.

Figure 14:
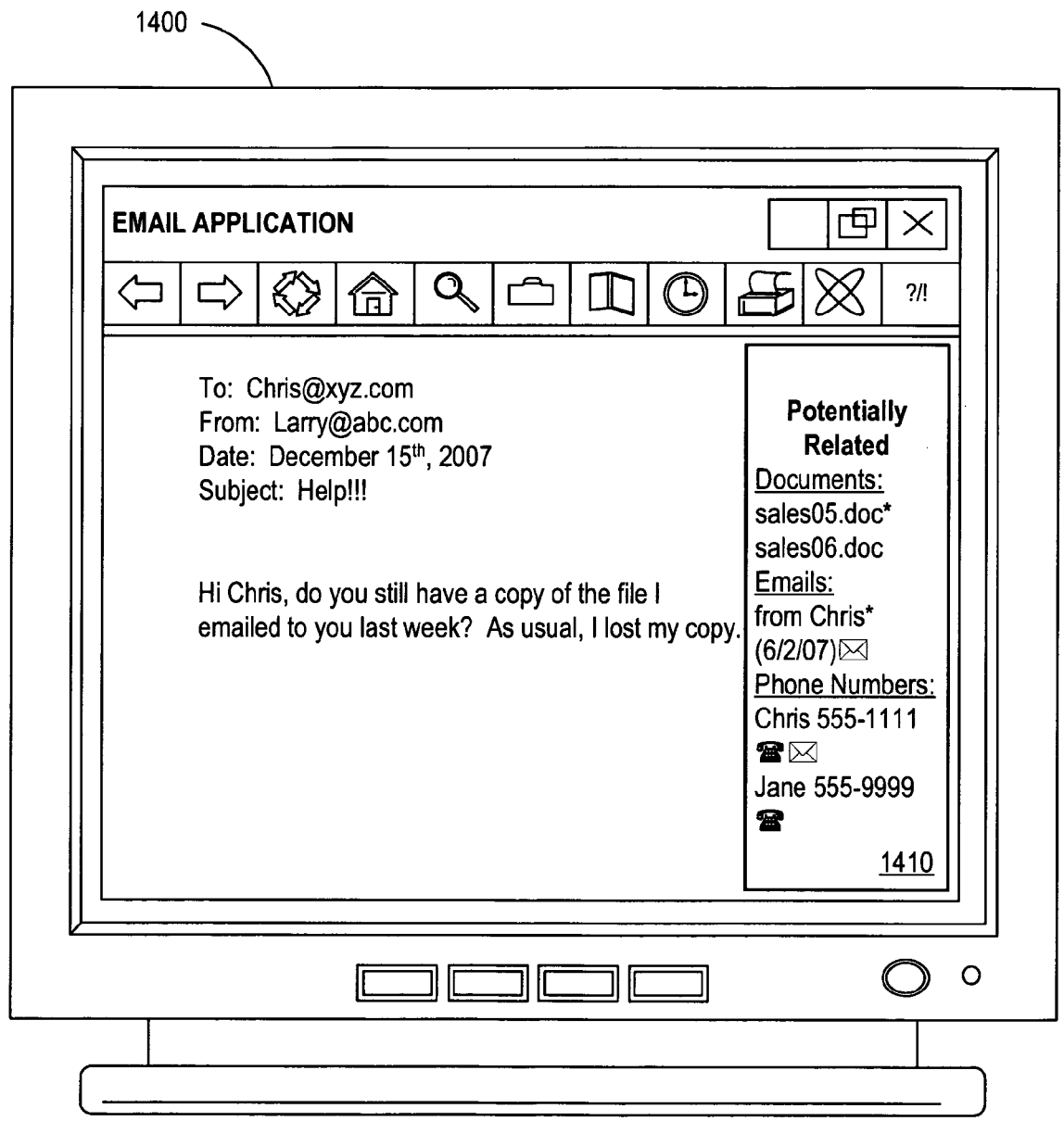
FIG. 14 is a display according to some embodiments.

For example, FIG. 14 is a display 1400 according to some embodiments. According to some embodiments, after a relevance list and any auxiliary lists are generated, they may be passed to another program. In some embodiments, the data objects are displayed in a GUI window along side the triggering data object.

For example, the current trigger data object may be displayed in a panel at the left side of the interface and a relevancy list 1410 may be displayed to the right. The data objects in the relevancy list can be optionally categorized by type. For example, documents may be grouped separately from phone numbers. As another example, all versions of a file or email message that are part of a thread could be grouped together.

Each data object in the relevance 1410 list may contain a hyperlink allowing the user to access the object and several options to perform different functions. The hyperlink may simply identify the location and name of the data object so that it may be opened in its native application (e.g., clicking on "sales06.doc" in the relevancy list 1410 might automatically open that document). A data object may alternately require a more complex interaction with an application to provide access. In such cases, the hyperlink might contain information to instruct the application how to handle the object and enable access. For example, the hyperlink for a telephone call data object could contain information to determine which application is able to place a telephone call and how to control the application to automatically place the telephone phone call for a user (e.g., when the telephone icon in the list 1410 is activated). Similarly, an email icon in the list 1410 could open a new message in an email application (and automatically make the message "to" the appropriate party.

According to some embodiments, a relevancy score or rank may be displayed next to objects in the list 1410. As another example, a small icon (e.g., "*") might be placed proximate to the objects in the list 1410 that are most likely to be of interest to the user.

A user may implicitly define the current context whenever a data object inside an application, service, peripheral, or server is activated or a notification is sent when it is ready to be used. However, it may occasionally be useful to allow a data object to become the trigger (and thus generate a new relevancy list) without opening it. This is useful when the user wishes to manually find relevant data objects that may be indirectly related to the trigger but are too distant from the trigger such that they do not appear in the relevancy list.

Figure 15:
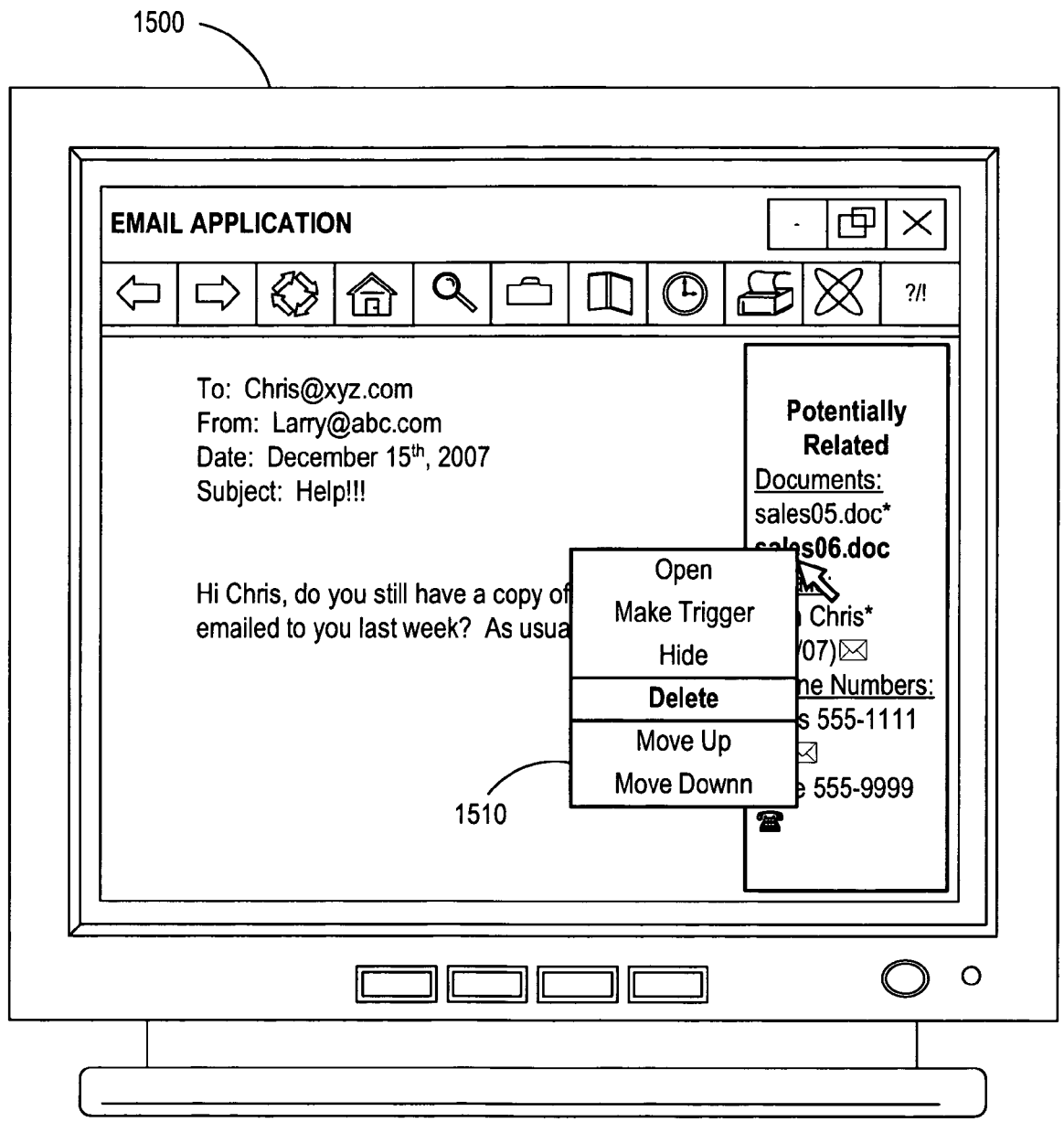
FIG. 15 is another display according to some embodiments.

FIG. 15 is another display 1500 according to some embodiments. In these embodiments, an option is available to each data object in the relevancy list that allows it to become the trigger without explicitly opening it first. By selecting this option, the corresponding data object becomes the trigger and the relevancy list is regenerated. In particular, a user may place the cursor over a data object in a list of potentially related data objects. If he or she then "right clicks" a mouse button, a set of choices 1510 is displayed to the user. He or she may then, for example, select the "make trigger" choice from the set 1510.

As a further example, suppose a person finds a data object via a keyword search. A list of data objects is returned that contain the keyword. If the desired data object is not included in the list, but one that is judged to be relevant to the desired one is included, that data object can be made to be the trigger by selecting the option. If the trigger and the desired object are directly or indirectly related, it may show up as part of the new relevancy list. For example, if a keyword search results in a document attachment, but the email that the document is attached to is the desired data object, selecting the option from the document attachment will result in the email message becoming part of the relevancy list. Note that the process of selecting the option can be performed several times to move "closer" to a desired data object or collection of data objects. This mechanism can be used as an alternate method of searching for context-relevant information, which is different from standard keyword search and from triggering a context change based on activity monitoring.

It can sometimes occur that a data object in the relevancy list is judged by the user to not be relevant or should not appear in the list for some reason, for instance if there is a privacy concern. The user is offered the opportunity to remove a data object from the list of relevant objects though a separate option (e.g., the choice "delete" in the set 1510). A data object may also get removed from the system if the underlying information source is deleted.

The way in which a data object is removed might have consequences on the resulting relevancy lists. One approach may be to completely remove the data object from the database, including any relevancy associations that have been built up through system monitoring. A result of completely removing the data object associations to other data objects is that indirectly connected relevant data objects that pass through the removed data object will be lost.

As another approach a data object might simply be marked as removed, hidden, or masked in the database. Any data object that is marked this way will not be added to (or displayed in) a relevancy list. However, in allowing the data object to maintain its relevancy associations to other data objects, all indirectly relevant data objects will continue to be brought into the relevancy list for a given trigger object.

Thus, embodiments of the present invention may provide efficient and useful ways to facilitate a user's access to data objects. In particular, some embodiments may be associated with systems that are able to learn from user behavior, over time, and can help alleviate some of the human effort required to maintain information by monitoring how data sources are used to infer which pieces of data are relevant to one another. The more closely a system can predict how users would themselves relate the information may increase the usefulness of the system, as it may be able to do things automatically that a user would otherwise perform manually. By inferring context (e.g., what the user is doing and what information might be useful at any given time), the system may provide people with useful information which can be utilized to complete tasks more quickly.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some embodiments have been described herein with respect to a single data object being a target or focus from which a list of potentially relevant data objects may be generated, according to other embodiments more than one focus data object may be permitted (any file that is currently "open" may be considered a focus data object). In this case, separate lists of potentially relevant data objects could be generated and displayed. As another approach, the two lists could be blended according to an algorithm and then displayed to the user.

Moreover, although some embodiments have been described herein with respect to a personal computer, note that other devices may practice any of the disclosed embodiments. Examples of such other devices include handheld devices, game devices, and media devices (e.g., set-top boxes).

In addition, although some embodiments have been described with respect to a single personal computer, note that embodiments may be associated with multiple devices. For example, an apparatus might exchange information through a "network." As used herein, the term "network" may refer to, for example, a Local Area Network (LAN), a Metropolitan Area Network (MAN), a Wide Area Network (WAN), a proprietary network, a wireless network, or an Internet Protocol (IP) network such as the Internet, an intranet or an extranet. In this case, the apparatus may determine evidence information associated with multiple devices or may use the evidence generated by multiple people. For example, the apparatus might determine that a particular document could be associated with a photograph stored on another personal computer in a user's home network. As a further example, two users may work independently on separate computers with different documents that each has evidence connected to a shared mutual document. Each user may then receive the other user's document as relevant to their own through the shared document.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating access to data objects, comprising:
capturing an event associated with a computer system;
in response to the captured event, selecting a subset of data objects that may be related to the event;
creating a list associated with the subset of data objects, wherein the list is at least partially ordered based on a degree of relevance ranking between a data object in the list and the event; and
outputting information associated with the created list;
wherein said event associated with a computing system comprises a data object gaining the focus of a graphical user interface;
wherein said data object gaining the focus of the graphical user interface comprises a window displaying an email message being opened or brought to the foreground;
wherein said outputting comprises displaying, in the window, indications of the subset of data objects; and
wherein the indications of the subset of data objects includes an indication of a data object stored in a database;
the method further comprising displaying a set of choices that includes a choice to remove the indication of the data object from the indications of the subset of data objects without completely removing the data object from the database.

2. The method of claim 1, wherein said outputting comprises transmitting the information to another application.

3. The method of claim 1, wherein selecting the subset of data objects includes:
associating the event with a trigger data object; and
selecting data objects directly related to the trigger data object.

4. The method of claim 3, wherein selecting the subset of data objects further includes:
selecting data objects indirectly related to the trigger data object through another data object.

5. The method of claim 4, wherein selecting the subset of data objects further includes:
selecting additional data objects in accordance with a rule.

6. The method of claim 5, wherein applying the rule requires:
associating an entity to a data object.

7. The method of claim 6, wherein the rule comprises selecting at least one of:
a phone number associated with an entity related to a data object,
an instant message identifier associated with an entity related to a data object,
contact information associated with an entity related to a data object,
a scheduled appointment associated with an entity related to a data object,
a recent email message to or from an entity related to a data object,
a message that is part of a communications thread to or from an entity related to a data object,
an instant message to or from an entity related to a data object,
a data object attachment to a communication to or from an entity related to a data object,
a telephone call to or from an entity related to a data object, or
a folder in which a data object resides.

8. The method of claim 1, further comprising:
dynamically updating the window when another event is captured.

9. The method of claim 1, wherein the window provides file system folder functionality.

10. The method of claim 9, wherein the file system folder functionality includes at least one of:
dragging a visual representation of a first data object onto a visual representation of a second data object to move the first data object to a new location, or
dragging the visual representation of a data object onto an external application to copy the data object to the application.

11. The method of claim 1, wherein the display of indications of data objects in the list includes:
grouping some of the data objects together when those data objects are related to each other.

12. The method of claim 11, wherein different data object versions of an initial data object are grouped together.

13. The method of claim 11, wherein different data objects associated with a single communication thread are grouped together.

14. The method of claim 1, wherein the indications include hyperlinks operable to access the data objects.

15. The method of claim 1, wherein the indications are operable to set a data object as a trigger data object.

16. The method of claim 1, wherein the indications are operable to remove a data object form the list.

17. The method of claim 1, wherein a plurality of indications can be in a selected state simultaneously.

18. The method of claim 1, wherein the captured event is associated with at least one of an application, a data object, a service, a peripheral, or a server.

19. The method of claim 18, wherein capturing the event comprises:
receiving a signal from a telephony device when an inbound telephone call is received; and
determining an originating telephone number associated with the inbound call.

20. The method of claim 19, wherein the telephony device is associated with at least one of: (i) a private branch exchange, (ii) a soft switch, (iii) a telephony server, (iv) a communication server, (v) a modem, (vi) a Centrix device, (vii) a telephone handset device, or (viii) a software phone.

21. The method of claim 18, wherein capturing the event comprises:
receiving a signal from a telephony device when an inbound telephone call is acknowledged; and
determining an originating telephone number associated with the inbound call.

22. The method of claim 18, wherein capturing the event comprises:
receiving a signal from a telephony device when an outbound telephone call is initiated; and
determining a destination telephone number associated with the inbound call.

23. The method of claim 18, wherein capturing the event comprises:
receiving a signal from a telephony device when an outbound telephone call is acknowledged; and
determining a destination telephone number associated with the inbound call.

24. The method of claim 18, wherein capturing the event comprises:
receiving a signal from an application when a data object associated with a person is accessed.

25. The method of claim 24, wherein the data object comprises an application contact record.

26. The method of claim 18, wherein capturing the event comprises:
receiving a signal from an application when a data object is accessed.

27. The method of claim 18, wherein capturing the event comprises:
receiving a signal from a messaging application when an inbound message is received.

28. The method of claim 1, wherein said outputting comprises transmitting properties associated with data objects in the list.

29. The method of claim 28, wherein the properties include at least one of:
data object names,
data object types,
data object identifiers,
data object ranking information relative to a trigger data object, or
application specific instructions operable to access specific data objects when a host application is launched.

30. A medium storing instructions adapted to be executed by a processor to perform a method, said method comprising:
capturing a user-initiated event associated with a computer system;
in response to the captured event, determining a subset of data objects that may be related to the event;
creating a list associated with the subset of data objects, wherein the list is at least partially ordered based on a degree of relevance between a data object in the list and the event;
grouping data objects in the list based on relationships between data objects within the subset; and
outputting information associated with the created list;
wherein said event associated with a computer system comprises a data object gaining the focus of the graphical user interface;
wherein said data object gaining the focus of the graphical user interface comprises a window displaying an email message being opened or brought to the foreground;
wherein said outputting comprises displaying, in the window, names associated with data objects in the grouped list; and
wherein the indications of the subset of data objects includes an indication of a data object stored in a database;
the method further comprising displaying a set of choices that includes a choice to remove the indication of the data object from the indications of the subset of data objects without completely removing the data object from the database.

31. An apparatus, comprising:
an event monitor to capture events associated with a computer system;
a list selection engine to select a subset of data objects, wherein the list is at least partially ordered based on a degree of relevance between a data object in the list and the event; and
a display to display a graphical user interface;
wherein said event associated with a computing system comprises a data object gaining the focus of the graphical user interface;
wherein said data object gaining the focus of the graphical user interface comprises a window displaying an email message being opened or brought to the foreground;
wherein the display comprises a display to display, in the window, indications of the subset of data objects;
wherein the indications of the subset of data objects includes an indication of a data object stored in a database; and
wherein the display to display the indications of the subset of data objects comprises a display to display a set of choices that includes a choice to remove the indication of the data object from the indications of the subset of data objects without completely removing the data object from the database.

32. The apparatus of claim 31, further comprising:
a list grouping engine to group some of the data objects together when those data objects are related to each other.

33. The method of claim 1, wherein said event associated with a computing system comprises:
a data object indicating that it is ready to be accessed.

34. The method of claim 1, wherein said capturing an event associated with a computer system, selecting a subset of data objects that may be related to the event; creating a list associated with the subset of data objects, wherein the list is at least partially ordered based on a degree of relevance ranking between a data object in the list and the event;

and outputting information associated with the created list are performed by a processor.

35. The medium of claim 30 wherein the capturing a user-initiated event associated with a computer system; the determining a subset of data objects that may be related to the event; the creating a list associated with the subset of data objects, and the grouping data objects in the list based on relationships between data objects within the subset are performed by the processor.

36. The method of claim 1, wherein said outputting further comprises displaying, in the window, a ranking next to each of the indications.

37. The method of claim 1, wherein the indications of the subset of data objects includes indications of data objects most likely to be of interest to a user and wherein the outputting further comprises displaying, in the window, an icon placed proximate to the indications of the data objects most likely to be of interest to the user.

* * * * *